United States Patent
Lee

(10) Patent No.: US 7,047,053 B2
(45) Date of Patent: May 16, 2006

(54) MOBILE TERMINAL

(75) Inventor: Sang-Jin Lee, Daly, CA (US)

(73) Assignee: Samsung Electronics Co., Ltd. (KR)

( * ) Notice: Subject to any disclaimer, the term of this patent is extended or adjusted under 35 U.S.C. 154(b) by 413 days.

(21) Appl. No.: 10/410,454

(22) Filed: Apr. 9, 2003

(65) Prior Publication Data

US 2004/0204203 A1    Oct. 14, 2004

(30) Foreign Application Priority Data

Apr. 12, 2002  (KR) ............................. 2002-20085

(51) Int. Cl.
    *H04M 1/00* (2006.01)
(52) U.S. Cl. .................. 455/575.3; 455/575.1
(58) Field of Classification Search ............. 455/575.1, 455/575.3, 90.3, 556.1, 550.1; 379/433.01, 379/433.13, 433.11
See application file for complete search history.

(56) References Cited

U.S. PATENT DOCUMENTS

| 4,666,328 | A |   | 5/1987 | Ryu |
| 5,485,517 | A |   | 1/1996 | Gray |
| 6,052,567 | A | * | 4/2000 | Ito et al. .................. 455/575.7 |
| 6,704,586 | B1 | * | 3/2004 | Park ........................ 455/575.3 |
| 2001/0004269 | A1 | * | 6/2001 | Shibata et al. ......... 348/333.06 |

FOREIGN PATENT DOCUMENTS

| CN | 2484703 |   | 3/2002 |
| EP | 1126709 A1 | * | 8/2001 |
| GB | 2 351 201 A |   | 12/2000 |
| JP | 2000-253124 |   | 8/2000 |
| JP | 2001156893 |   | 8/2001 |
| JP | 06252824 |   | 9/2004 |
| WO | WO 01/84269 |   | 11/2001 |

OTHER PUBLICATIONS

English translation of JP06252824A (provided in IDS filed Sep. 30, 2004) that is provided by the Japanese Patent Office's website (http://www.jpo.go.jp/).*
European Search Report dated Oct. 29, 2003 issued in a counterpart application, namely, Appln. No. 03008482.6.

* cited by examiner

*Primary Examiner*—Doris H. To
*Assistant Examiner*—Lewis West
(74) *Attorney, Agent, or Firm*—Dilworth & Barrese LLP

(57) ABSTRACT

Disclosed is a mobile terminal comprising: a main body having a ceiling, a bottom, an inner wall between the ceiling and bottom, and a first receiving space surrounded by the ceiling, the bottom, the inner wall and a hinge axis; a sub-body rotatable around the hinge axis, which is perpendicularly provided in an upper portion of the main body; the sub-body being received within the first receiving space to close the mobile terminal and released from the first receiving space to open the mobile terminal; and a second receiving space expanded in a radial direction of the hinge axis having a predetermined diameter through the main and sub-bodies and having connector terminals in an inner wall thereof. The inventive mobile terminal provides a novel design over those of conventional terminals. For example, various attachments can be connected to the inventive mobile terminal via the second receiving space, thereby imparting more various functions to the same.

12 Claims, 5 Drawing Sheets

MOBILE TERMINAL

PRIORITY

This application claims priority to an application entitled "Mobile Terminal" filed in the Korean Intellectual Property Office on Apr. 12, 2002 and assigned Serial No. 2002-20085, the contents of which are hereby incorporated by reference.

BACKGROUND OF THE INVENTION

1. Field of the Invention

The present invention relates to a mobile terminal, in particular, which comprises a main body and a sub-body receivable within the main body.

2. Description of the Related Art

As well known in the art, mobile terminals can be divided into bar, flip and folder type terminals.

The bar type terminal has data I/O means and transmitting/receiving modules in one body housing. In the bar type terminal, a key pad functioning as data input means is constantly exposed, potentially creating malfunction, and downsizing thereof is restricted since a predetermined distance is required between transmitting and receiving units.

The flip type terminal comprises a body, a flip and hinge means for connecting the flip to the body. The body has data input/output means and transmitting/receiving modules, and the flip covers a key pad functioning as data input means to help prevent any malfunction. However, downsizing is also restricted in the flip type terminal for reasons including the need to maintain a predetermined distance is required between transmitting and receiving units.

The folder type terminal comprises a body, a folder and hinge means for rotatably connecting the folder to the body so that the folder is rotated to open the folder type terminal. The body has a key pad and a transmitting unit functioning as data input means, and the folder has a display unit and a receiving unit functioning as data output means. The folder is in close contact with the body in the standby mode to prevent any malfunction, and unfolded in the conversation mode to ensure the distance between transmitting and receiving units by a sufficient amount resultantly imparting an advantage of downsizing to the folder type terminal.

The construction of the bar, flip and folder type terminals can be readily understood by those skilled in the art.

However, the conventional mobile terminals are restricted to the flip and folder types in external design resultantly failing to satisfy various desires of consumers. Moreover, although attachments to mobile terminals are getting diversified according to various mobile communication services, methods for connecting the attachments to the mobile terminals are extremely restricted.

SUMMARY OF THE INVENTION

The present invention has been made to solve the foregoing problems and it is therefore an object of the present invention to provide a mobile terminal capable of satisfying various tastes and desires of consumers while allowing various attachments to be easily connected.

According to an aspect of the invention to obtain the above objects, there is provided a mobile terminal comprising: a main body having a ceiling, a bottom, inner walls between the ceiling and bottom and a first receiving space surrounded by the ceiling, bottom and inner walls; a sub-body rotatable around a hinge axis which is perpendicularly provided in an upper portion of the main body, the sub-body being received in the first receiving space to close the mobile terminal and released from the first receiving space to open the mobile terminal; and a second receiving space expanded in a radial direction of the hinge axis up to a predetermined diameter to penetrate the main and sub-bodies and having connector terminals in an inner wall thereof.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following detailed description will present a preferred embodiment of the invention in reference to the accompanying drawings, in which well-known functions or constructions will not be described in detail since they would unnecessarily obscure the understanding of the invention.

Figure 1:
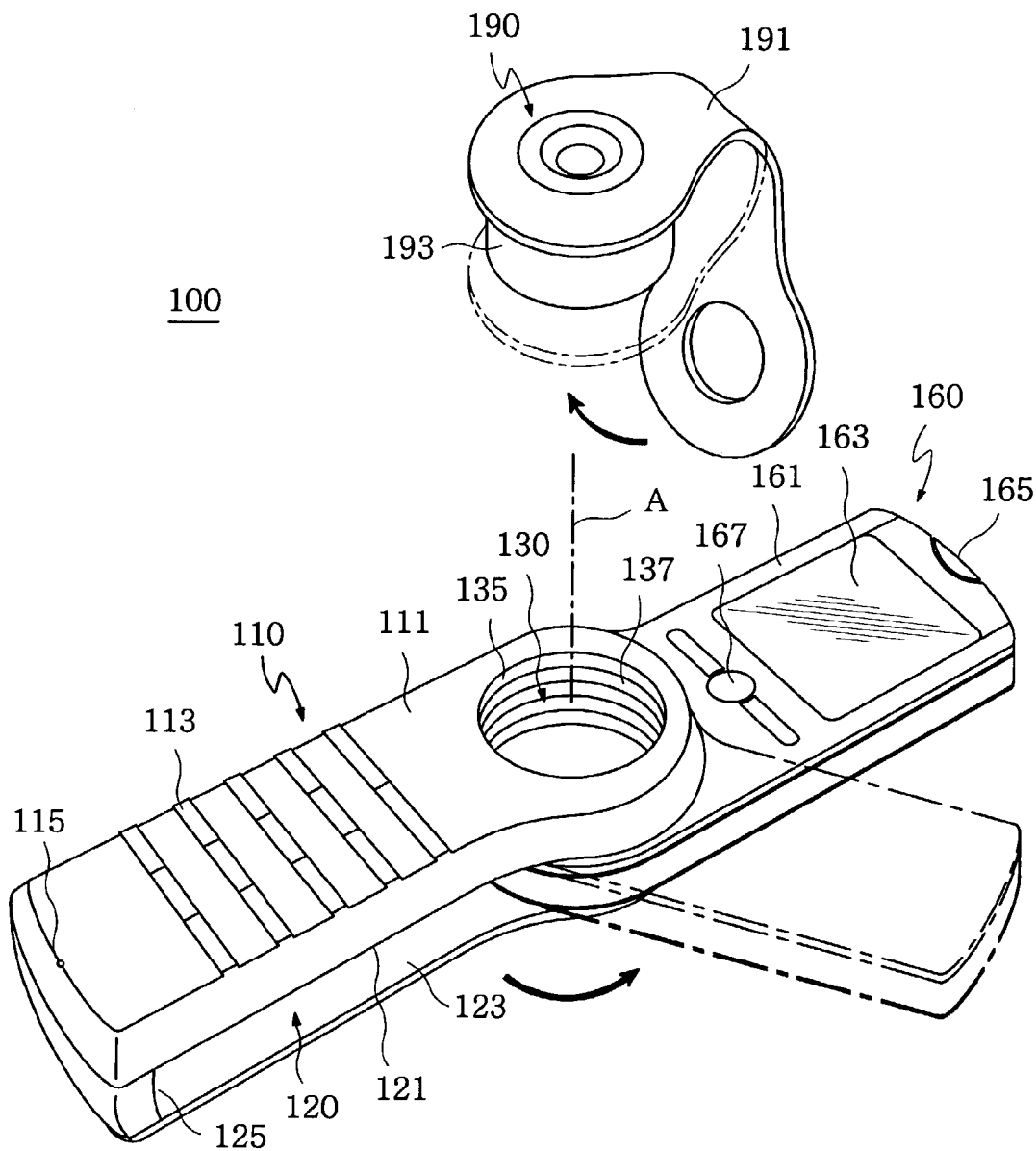
FIG. 1 is a perspective view of a mobile terminal according to a preferred embodiment of the invention.
Figure 2:
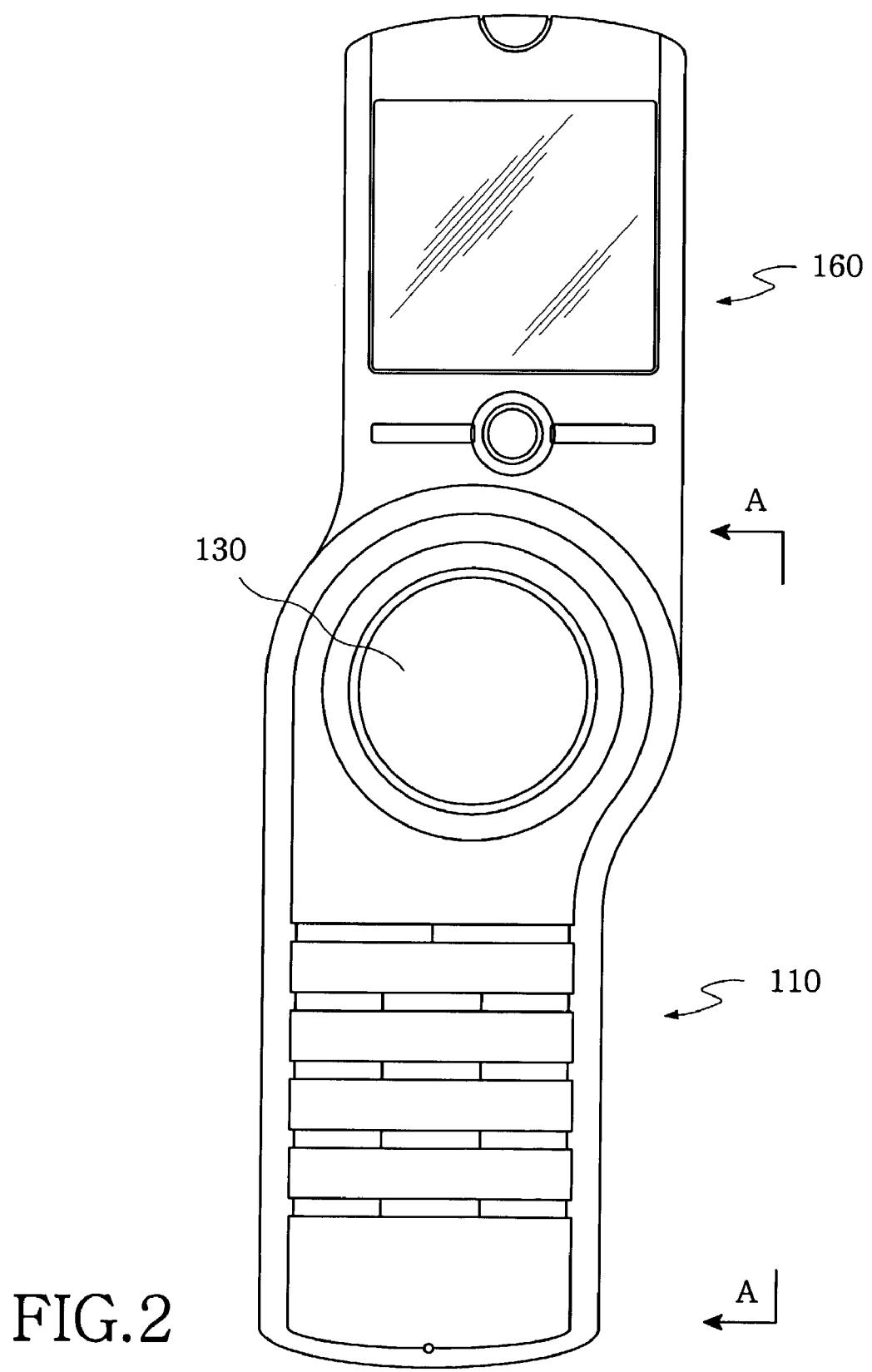
FIG. 2 is a plan view of the mobile terminal shown in FIG. 1.

FIG. 1 is a perspective view of a mobile terminal 100 according to a preferred embodiment of the invention, and FIG. 2 is a plan view of the mobile terminal 100 shown in FIG. 1.

As shown in FIGS. 1 and 2, the mobile terminal 100 according to the preferred embodiment of the invention has a main body 110, a sub-body 160 pivotably coupled to the main body 110 and a second receiving space 130 for connection of an attachment at a predetermined position.

The main body 110 has a key pad 113 in, the upper face 111 including a number of key buttons and a transmitting unit 115 in one side of the key pad 113 with a microphone which is internally mounted thereon. The main body 110 is further provided with a first receiving space 120 between the upper face 111 and the lower face of the main body 110, within the main body 110. The first receiving space 120 is surrounded by the ceiling 121, the bottom 123 opposed to the ceiling 121, an inner wall 125 provided between the ceiling 121 and the bottom 123, and a hinge axis A. The first receiving space 120 receives the sub-body 160 during the standby mode. At the top end of the upper face 111 of the main body 110, the hinge axis A is perpendicular to the upper face 111 together with a through-hole through the hinge axis A having a predetermined diameter that defines the second receiving space 130, which penetrates the main body 110.

Figure 4:
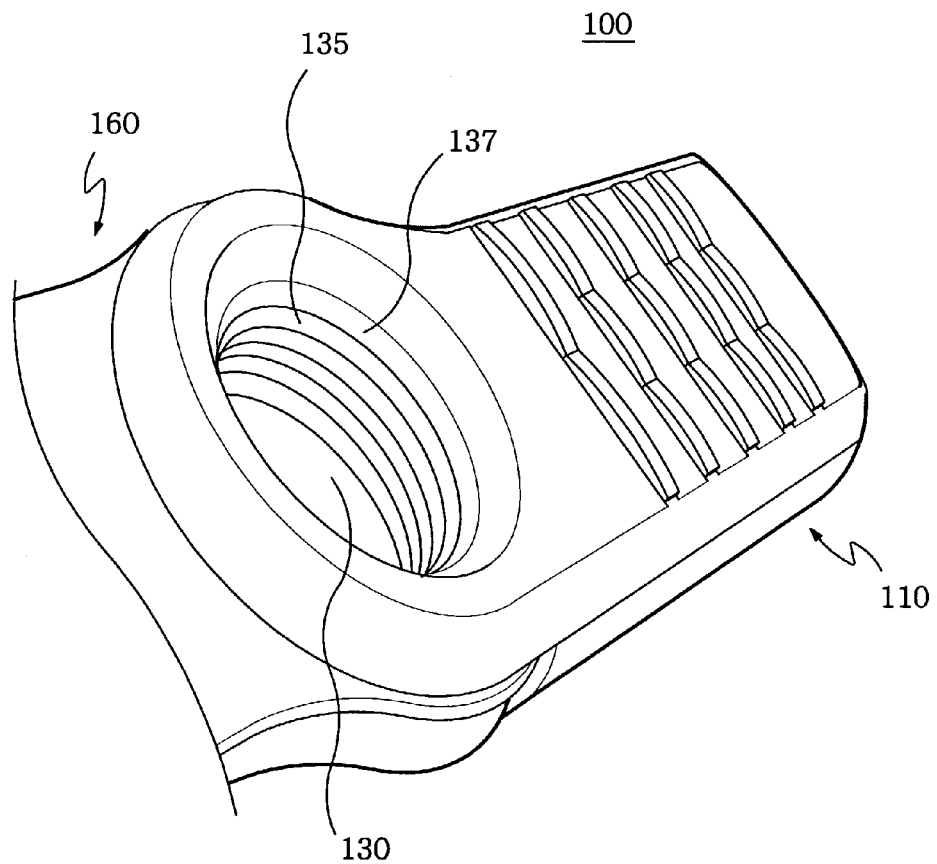
FIG. 4 is a perspective view of a through-hole of the mobile terminal shown in FIG. 1.

Referring to FIG. 4, it can be seen that a plurality of connector terminals 137 are provided in an inner wall 135 of the second receiving space 130. The connector terminals 137 provide electric connection to attachments of the mobile terminal 100, e.g. a camera lens assembly 190 as shown in FIG. 1.

The camera lens assembly 190 has a configuration corresponding to the second receiving space 130, and is detachably received in the second receiving space 130 via restraining means 191 that preferably is made of soft rubber. Further, the camera lens assembly 190 preferably has terminals (not shown)on its outer periphery 193 corresponding to the connector terminals 137 on the inner wall 135 of the second receiving space 130, and is electrically connected to the mobile terminal 100 via the terminals on outer periphery 193.

The restraining means 191 is fixed by one end to the camera lens assembly 190, and by the other end, readily fixes the camera lens assembly 190 to the second receiving space 130. Further, the restraining means 191 can be utilized not only as an ornament of the mobile terminal 100 but can be functionally configured to act as a hanger for the mobile terminal 100.

The sub-body 160 has an LCD 163 in a sub-body upper face 161 functioning as a display unit, a receiving unit 165 internally equipped with a speaker assembly above the LCD 163 and function keys 167 of the mobile terminal 100 are typically positioned below the LCD 165.

Figure 3:
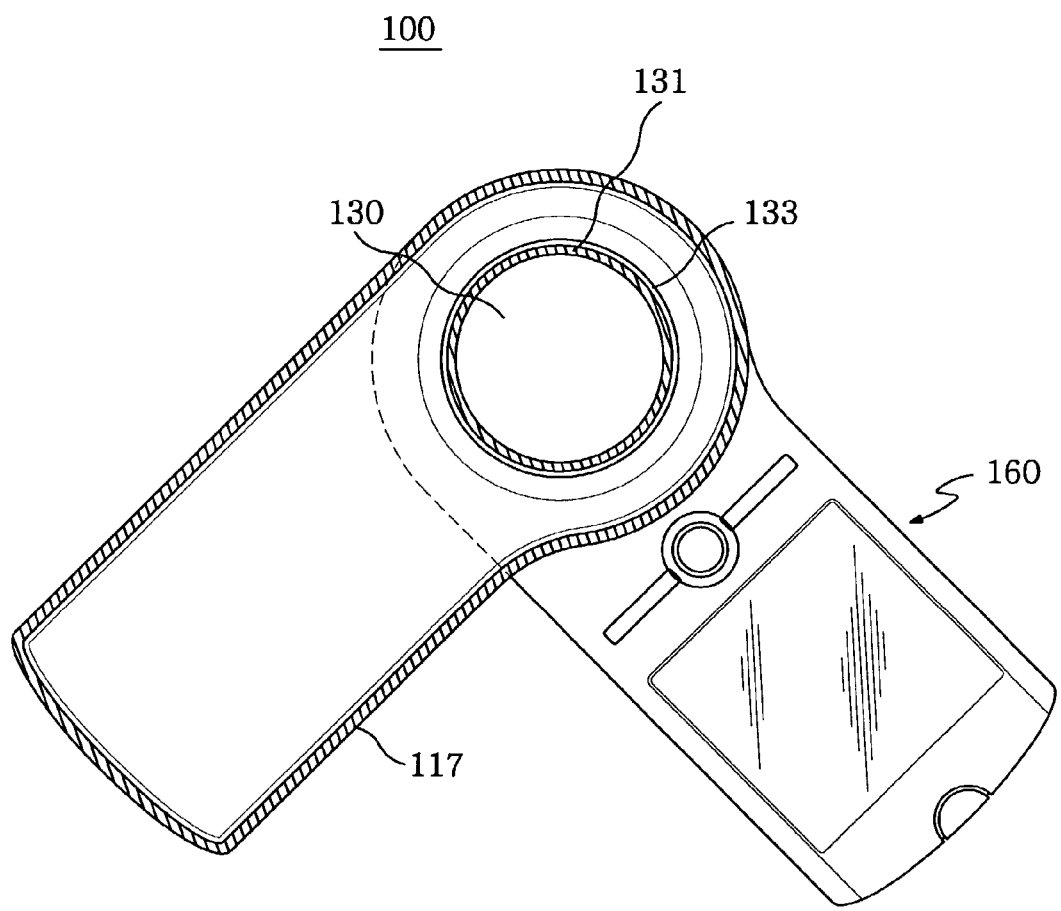
FIG. 3 is a second plan view of the mobile terminal shown in FIG. 1 in partial cross-section taken along line A—A of FIG. 2.

The following description will present a coupling method of the main body 110 and the sub-body 160 in reference to FIG. 3. FIG. 3 is a plan view of the mobile terminal shown in FIG. 1 in which a housing 117 of the main body 110 is partially shown in cross-section. As shown in FIG. 3, the sub-body 160 has a through-hole 133 in one end thereof which aligns with the through-hole forming second receiving space. The through-hole 133 of the sub-body 160 is configured to surround the outer periphery of a rib 131 defining the second receiving space 130 of the main body 110, resultantly providing means for coupling the sub-body 160 to the main body 110. The main body 110 and the sub-body 160 are coupled to each other via the rib 131 and the through-hole 133, which are respectively provided to the main and sub-bodies 110 and 160, so that the sub-body 160 is rotatable around the hinge axis A which is perpendicular to the upper face 111 of the main body 110.

As set forth above, as rotatable around the hinge axis A which is perpendicular to the upper face 111 of the main body 110, the sub-body 160 is received in the first receiving space 120 of the main body during the standby mode, and during the conversation mode leaves the first receiving space 120 by rotating to a proper angle up to a position required for convenient conversation. The transmitting unit 115 and the receiving unit 165 are positioned at a distance from the hinge axis A to ensure a proper space between them which is necessary for a user in conversation.

Figure 5:
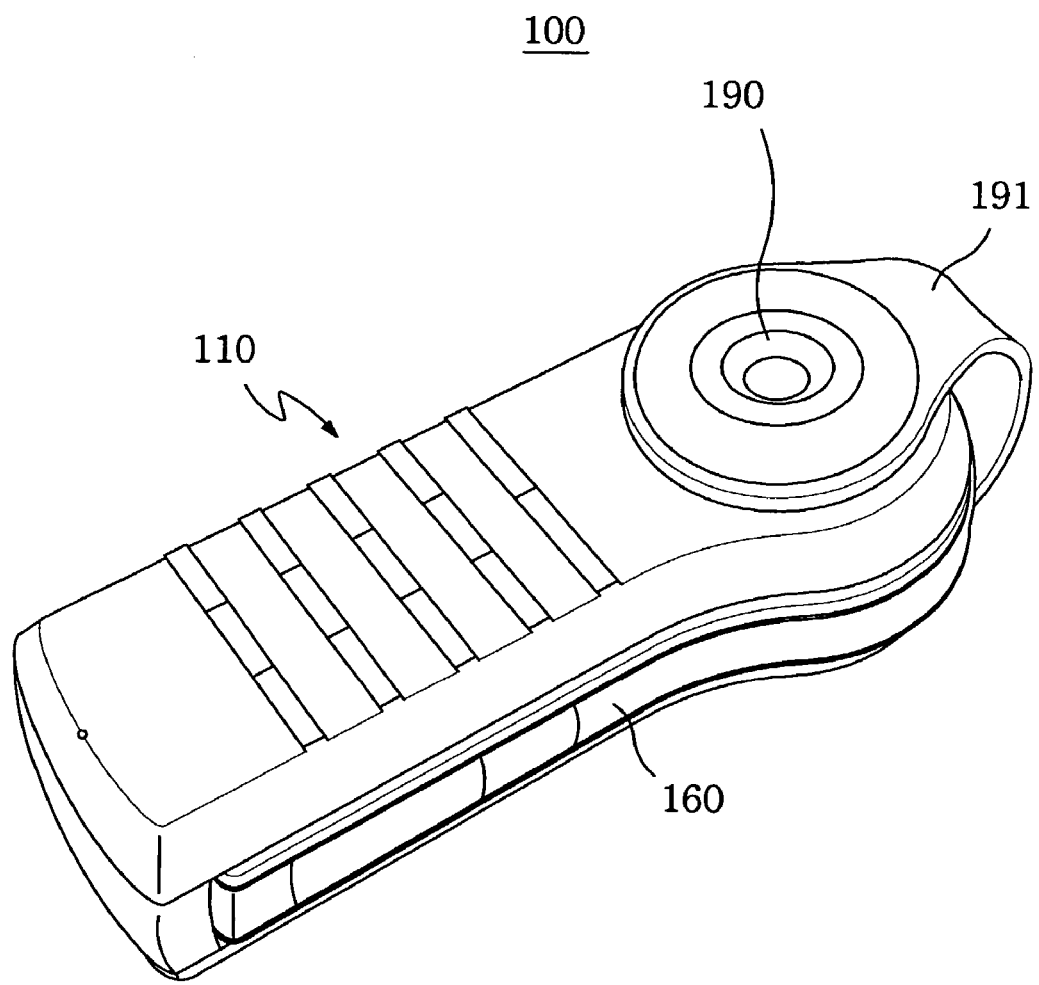
FIG. 5 is a perspective view of the mobile terminal shown in FIG. 1 on which an attachment is mounted.

FIG. 5 is a perspective view of the mobile terminal 100 shown in FIG. 1 on which the camera assembly 190 is mounted as an attachment. As shown in FIGS. 1 to 5, the second receiving space 130 of the mobile terminal 110 provides a space to which an attachment, such as the camera lens assembly 190, can be detachably attached. The camera lens assembly 190 is detachably attached to the second receiving space 130 of the main body 110 via the restraining means 191 and is electrically connected via the connector terminals 137 in the inner wall 135 of the second receiving space 130.

As set forth above, the mobile terminal 100 of the invention enables the sub-body 160 to be placed within the first receiving space 120 of the main body 110 and to be rotated around the hinge axis A, which is perpendicular to the upper face 111 of the main body 110, so as to open up to the angle required for convenient conversation.

Although the invention has been shown and described with reference to certain preferred embodiments thereof, it will be understood by those skilled in the art that various changes in form and details may be made therein without departing from the spirit and scope of the invention as defined by the appended claims.

The present invention as set forth above provides a novel design of mobile terminal beyond conventional designs of flip or folder type terminals, in which the sub-body is placed within the receiving space provided in the main body as well as rotated around the hinge axis perpendicular to the upper face of the main body so as to open to the angle necessary for convenient conversation. Further, the second receiving space is provided in the hinge axis of the sub-body to allow connection of various attachments, thereby improving the durability of the attachments. Moreover, examples of the attachments include the camera assembly as well as an MP3 player which may be selectively replaced at the convenience of the user, thereby enhance the expansibility of the mobile terminal.

What is claimed is:

1. A mobile terminal comprising:
    a main body having an internal space formed by a ceiling, a bottom and an inner wall to define a first receiving space surrounded by said ceiling, bottom and inner wall;
    a sub-body rotatable around a hinge axis which is perpendicular to an upper face of said main body, wherein said sub-body is received within said first receiving space to close said mobile terminal and is released from said first receiving space to open said mobile terminal; and
    a second receiving space of a predetermined diameter having a center at the hinge axis, wherein the second receiving space penetrates said main body and sub-body to form a through-hole therethrough.

2. The mobile terminal in accordance with claim 1, wherein said main body comprises a key pad and a transmitting unit in an upper face thereof.

3. The mobile terminal in accordance with claim 1, wherein said sub-body comprises a display unit and a receiving unit in an upper face thereof.

4. The mobile terminal in accordance with claim 3, wherein said sub-body further comprises a function key.

5. The mobile terminal in accordance with claim 1, further comprising an attachment that is detachably attached to said second receiving space.

6. The mobile terminal in accordance with claim 5, wherein said attachment comprises a camera lens assembly.

7. The mobile terminal in accordance with claim 5, wherein said attachment is restrained via a restraining means.

8. The mobile terminal in accordance with claim 7, wherein said restraining means is made of soft rubber.

9. The mobile terminal in accordance with claim 1, further comprising connector terminals on an inner wall of said second receiving space.

10. The mobile terminal in accordance with claim 9, wherein said connector terminals are layered along said hinge axis.

11. The mobile terminal in accordance with claim 9, further comprising an attachment to be received in the second receiving space having terminals in electrical contact with the connector terminals on the inner wall of the second receiving space.

12. A mobile terminal comprising:
- a main body having an internal space formed by a ceiling, a bottom and an inner wall to define a first receiving space surrounded by said ceiling, bottom and inner wall;
- a sub-body rotatable around a hinge axis which is perpendicular to an upper face of said main body, wherein said sub-body is received within said first receiving space to close said mobile terminal and is released from said first receiving space to open said mobile terminal;
- a second receiving space of a predetermined diameter having a center at the hinge axis, wherein the second receiving space penetrates said main body and sub-body to form a through-hole therethrough; and
- a detachable camera attachment detachably attached to the mobile terminal at said second receiving space.

\* \* \* \* \*